(12) United States Patent
Reaux (10) Patent No.: US 6,807,799 B2
(45) Date of Patent: Oct. 26, 2004

(54) SUGARCANE HARVESTER AND HARVESTING SYSTEM

(75) Inventor: James R. Reaux, Brookshire, TX (US)

(73) Assignee: HarvesTech, LLC, St. Martinville, LA (US)

( * ) Notice: Subject to any disclaimer, the term of this patent is extended or adjusted under 35 U.S.C. 154(b) by 0 days.

(21) Appl. No.: 10/461,164

(22) Filed: Jun. 12, 2003

(65) Prior Publication Data

US 2004/0074217 A1 Apr. 22, 2004

Related U.S. Application Data (60) Provisional application No. 60/388,700, filed on Jun. 13, 2002.

(51) Int. Cl.$^7$ ............................................... A01D 34/00
(52) U.S. Cl. .......................... 56/14.3; 56/14.5; 56/13.9; 56/64
(58) Field of Search ........................ 56/503, 14.3, 14.5, 56/13.9, 64, 60

(56) References Cited

U.S. PATENT DOCUMENTS

| | | | | |
|---|---|---|---|---|
| 3,791,114 A | * | 2/1974 | Fowler | ........................ 56/13.9 |
| 3,946,875 A | * | 3/1976 | Fowler | ........................ 209/639 |
| 4,295,325 A | * | 10/1981 | Cannavan | ................... 56/13.9 |
| 4,512,142 A | * | 4/1985 | Landry et al. | ............... 56/13.9 |
| 5,379,577 A | * | 1/1995 | Caillouet | ..................... 56/14.3 |
| 6,363,700 B1 | * | 4/2002 | Fowler | ........................ 56/13.9 |

* cited by examiner

Primary Examiner—Árpád Fábián Kovács
(74) Attorney, Agent, or Firm—William W. Stagg (57) ABSTRACT

A harvester for harvesting stalks of sugarcane having a plurality of harvest chambers. Each harvest chamber has a pair of opposing side walls that forming a V-shaped forward opening for receiving sugarcane stalks to be cut for harvest and a plurality of revolving, opposing, resilient conveyor belts for grabbing, holding and feeding the sugarcane stalks through the chambers in a substantially upright position. Each harvest chamber has a plurality of adjustable blowers to selectively direct a high velocity air stream onto the sugarcane stalks to remove unwanted foliage from the sugarcane stalks and a vacuum system to suction unwanted foliage from the harvest chambers to a foliage collection chamber located within the harvester. Each harvest chamber has a sugarcane stalk cutting mechanism that includes a cutting fluid storage tank and a conduit and pump system to deliver the cutting fluid through hydraulic jets to the sugarcane stalks at a pressure and velocity sufficient for cutting the sugarcane stalks at desired locations along their length as the sugarcane cane stalks move through the harvest chambers and a conveyer system to deliver the cut sugarcane stalks from the harvest chamber to a desired location within the harvester. A control system is provided to control the various harvester systems.

59 Claims, 8 Drawing Sheets

SUGARCANE HARVESTER AND HARVESTING SYSTEM

This application claims priority to U.S. Provisional Application Ser. No. 60/388,700 filed Jun. 13, 2002 by James R. Reaux, the entire contents of which are hereby incorporated by reference.

FIELD OF INVENTION

The present invention generally relates to the field of sugarcane harvesting and, more particularly, presents sugarcane harvesting apparatus and system for gathering, defoliating, cutting, and off loading raw, green, clean sugarcane. The invention eliminates the need for pre-burning the cane field prior to cutting and employs a high-pressure water jet cutting system and an onboard waste collection and disposal system.

BACKGROUND OF INVENTION

There has been an increase in demand in recent years for environmentally safe harvesting methods and equipment to be utilized in the growing and harvesting of sugarcane. Current sugarcane harvesting methods employ mechanical harvesters that utilize blade cutters for cutting the stalks of sugarcane. The width and frequent dullness of these rotating cutting blades tear rather than cut the cane stalk thereby destabilizes the sugar cane root system. In an effort to facilitate loading of the cut sugar cane, it is common to burn the field either before harvesting while the sugar cane is standing (extremely high flames associated with large fires and smoke clouds) to facilitate harvesting with a combine, or after cutting to burn the leaves from the sugarcane stalks in order to facilitate loading with the conventional sugar cane loading equipment. After the sugarcane is cut, the fields are often burned to remove any residual cane stalks and stubble remaining in the field. Field burning, whether before or after the sugarcane harvest, has a harmful effect on the environment in that the burning produces clouds of smoke, ash and dust that are detrimental to air quality, create health hazards, reduce ozone, impede traffic, and create an environmental nuisance.

SUMMARY OF INVENTION

The present invention and system is designed to eliminate the necessity of burning cane fields both before and after the cane harvest and consequently presents an environmentally preferred alternative to current sugarcane harvesting devices. The invention and system includes a harvester chassis having a conventional propulsion means such as a diesel engine and/or hydraulic motors, transmissions, drive shafts, axles and wheel assemblies.

Mounted on the harvester chassis is a plurality of harvest chambers. Each harvest chamber has a V-shaped entrance for receiving a row of sugarcane stalks and a series of revolving resilient conveyor belts for grabbing, holding and feeding the sugarcane through the harvest chamber in a substantially upright position. Within each harvest chamber, at selected locations, is a plurality of blower nozzles (infinitely adjustable both in azimuth and angle) for directing high velocity streams of air (either direct or cyclone) on to the sugarcane stalks to remove the stems and leaves from the stalks of sugarcane. At the base of each harvest chamber is a plurality of lower vacuum or suction openings connected to a suction motor for removing by vacuum the leaves and stems from the harvest chamber and for delivering the leaves and stems removed to a foliage collection area having a "kill chamber" for decomposition of the leaves and stems.

Also positioned within the harvest chamber at selected locations are upper and lower cutting mechanisms. The upper cutting mechanism is intended to trim the top of the sugarcane stalks to an even height. The lower cutting mechanism is intended to cut the sugarcane stalks at their base. A plurality of upper vacuum or suction openings connected to a suction motor are positioned toward the top of the harvest chamber to remove by vacuum the leaves and stems cut from the top of the sugarcane stalks and for delivering the cut leaves and stems so removed to the foliage collection area.

As the sugarcane stalks are being cut and thereafter, they are grabbed and moved through the chamber by means of the revolving resilient conveyor belts to a collection bay for subsequent transfer to collection vehicles and ultimately to a grinding mill or other desired location. Additional cutters may be included within the harvest chamber to cut the sugarcane stalks to desired lengths to facilitate their delivery to the mill.

In applicant's invention the desired cutting device for both the upper and lower cutting mechanisms are hydraulic jets for delivering needle-like streams of water or other desired fluid at high pressure for cutting the stalks. The hydraulic jets are supplied by on-board water reservoirs and pumps mounted on the chassis of the harvester. Collection troughs and pumping means are provided to collect and deliver the residual fluids produced from the jets back to the reservoirs for reuse. The water used for the jets may be treated with fertilizers, insecticides, preservatives or other such chemicals as may be required to facilitate the growing, harvesting and processing of the sugarcane stalks. Fine grit abrasives may be added to the water or other cutting fluid to facilitate cutting. While it is thought that the harvester will best be served by cutting jets, alternative cutting devices for both the upper and lower cutting mechanisms such as cutting lasers or rotating blades could also be utilized as either the upper and lower cutting means described herein.

The foliage collection area is mounted toward the rear of the harvester for receiving the leaves, stems and other debris removed by vacuum from the harvest chambers. The debris so collected is transferred to a shredding assembly and ultimately to a recycling assembly for decomposition by closed incineration or other decomposing means. The incinerated or otherwise decomposed debris is then delivered back to the field. The delivery of the decomposed debris may be accomplished by injection means or by blowing the decomposed pelletized debris into the soil. The harvester may be fitted with a pelletizing device to compact the decomposed debris into small pellets to minimize the force needed for injection.

Also mounted on the chassis, for incorporation into the harvester and system, is a means for providing hydraulic or electrical power to activate a plurality of harvesting equipment, blowers, vacuums, conveyors, elevators and other accessories that may be incorporated into the harvester.

DESCRIPTION OF EMBODIMENTS

Figure 1:
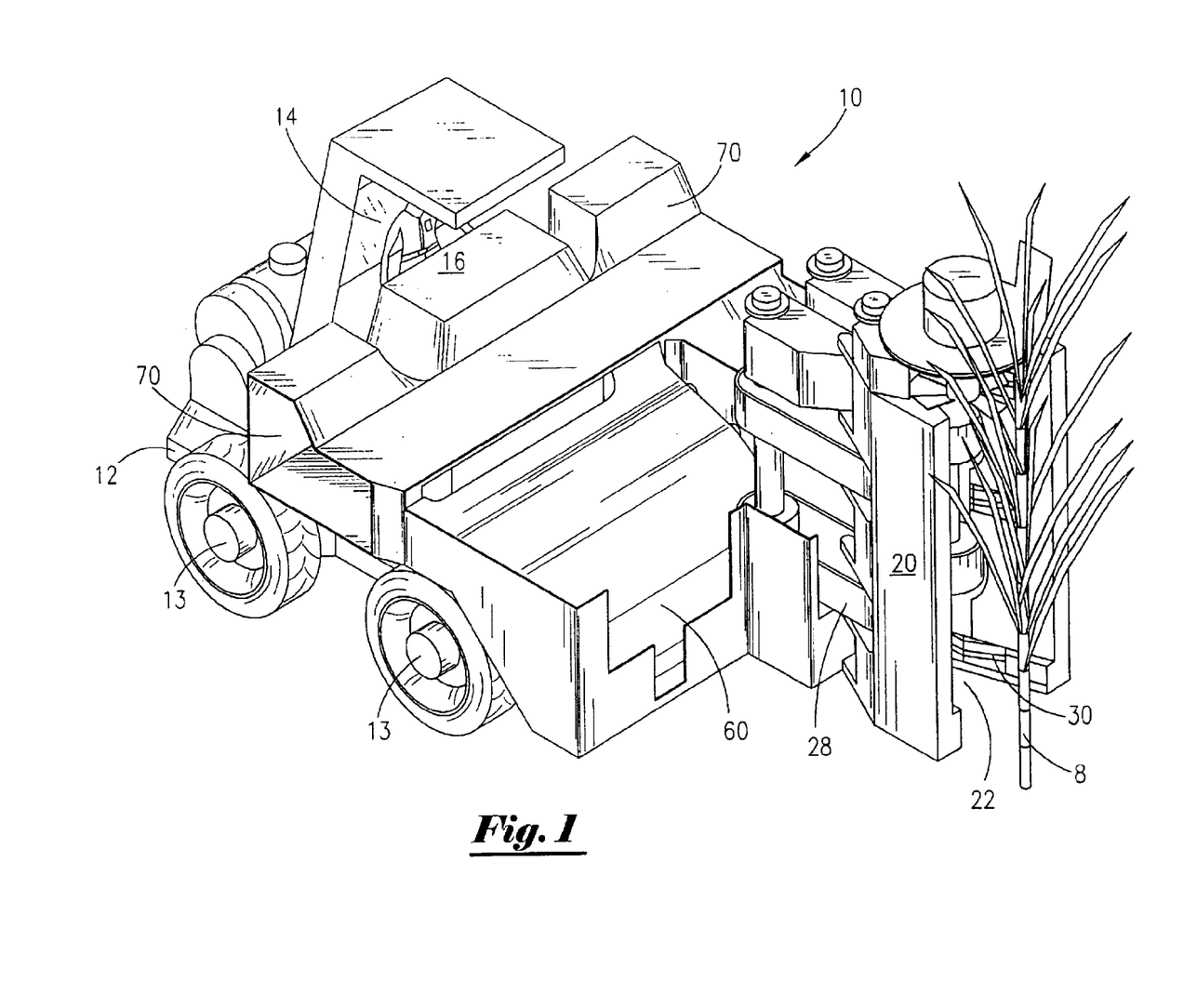
FIG. 1 is a perspective view of the Sugarcane Harvester of Applicant's invention.

Referring now to the drawings and more particularly to FIG. 1 there is shown a perspective view of the sugarcane harvester (10) of applicant's invention. The harvester (10) has a chassis (12) having a conventional propulsion means such as a diesel engine and/or hydraulic motors, transmissions, drive shafts, axles and wheel assemblies all generally depicted as (13), an operator cockpit (14) and a control station (16). Mounted on the chassis (12), for operation via the control station (16), are a plurality of harvest chamber assemblies (20). Each harvest chamber assembly (20) has a defoliation blower assembly (30), a debris vacuum assembly (40) and a stalk cutting assembly (50). Also mounted on the chassis (12) is a cut stalk collection bay assembly (60), a plurality of stalk discharge assemblies (70) and a foliage collection and recycling assembly (80).

Figure 2:
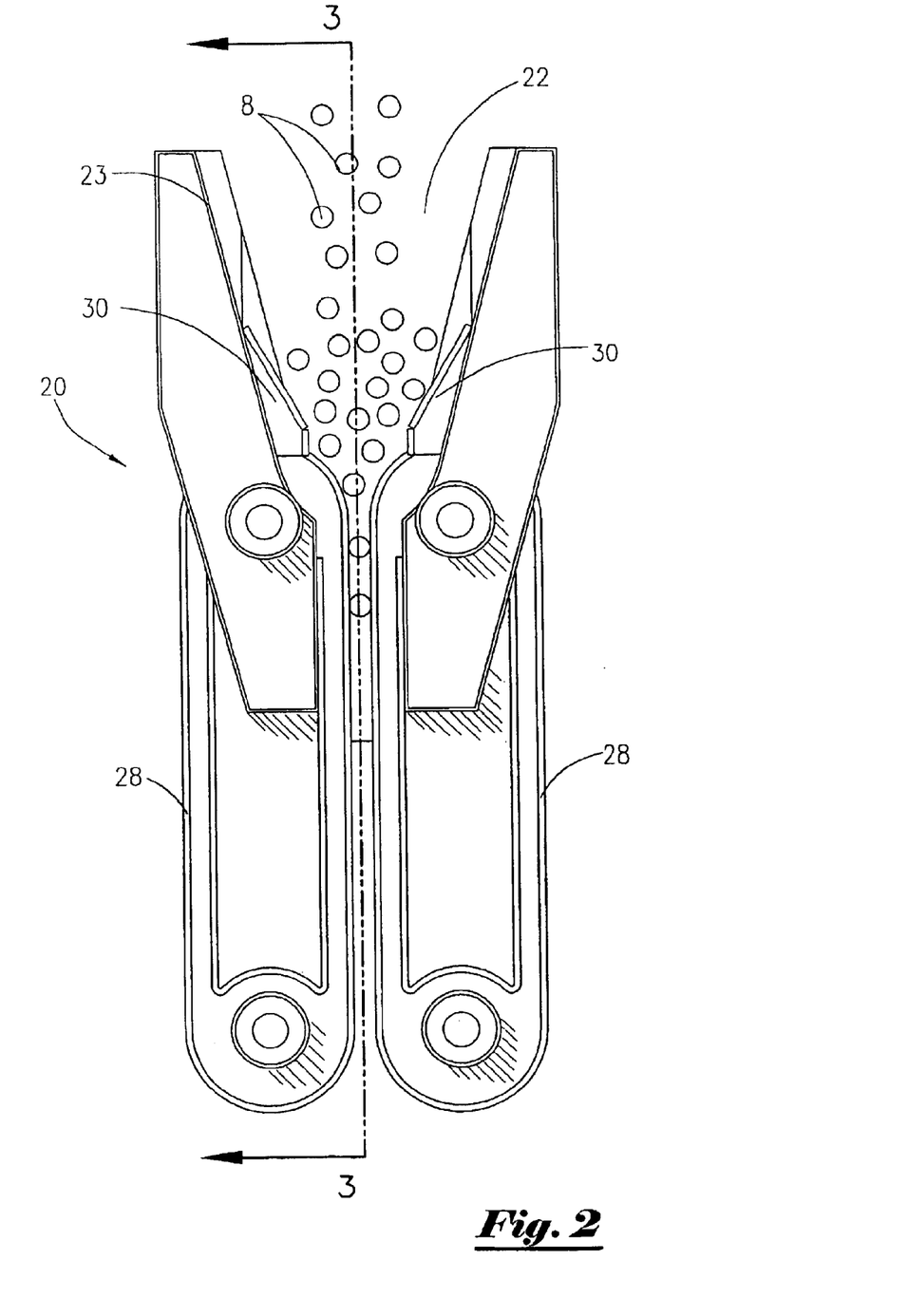
FIG. 2 is a plan view of the harvest chamber of the Sugarcane Harvester depicted in FIG. 1.

As can be seen in FIGS. 1 and 2, each harvest chamber (20) has a V-shaped entrance (22) formed from sidewalls (23) and (24) which serve to funnel the stalks (8) into the chamber (20) as the harvester (10) is propelled along the rows of sugarcane by its propulsion mechanism (13).

Figure 3:
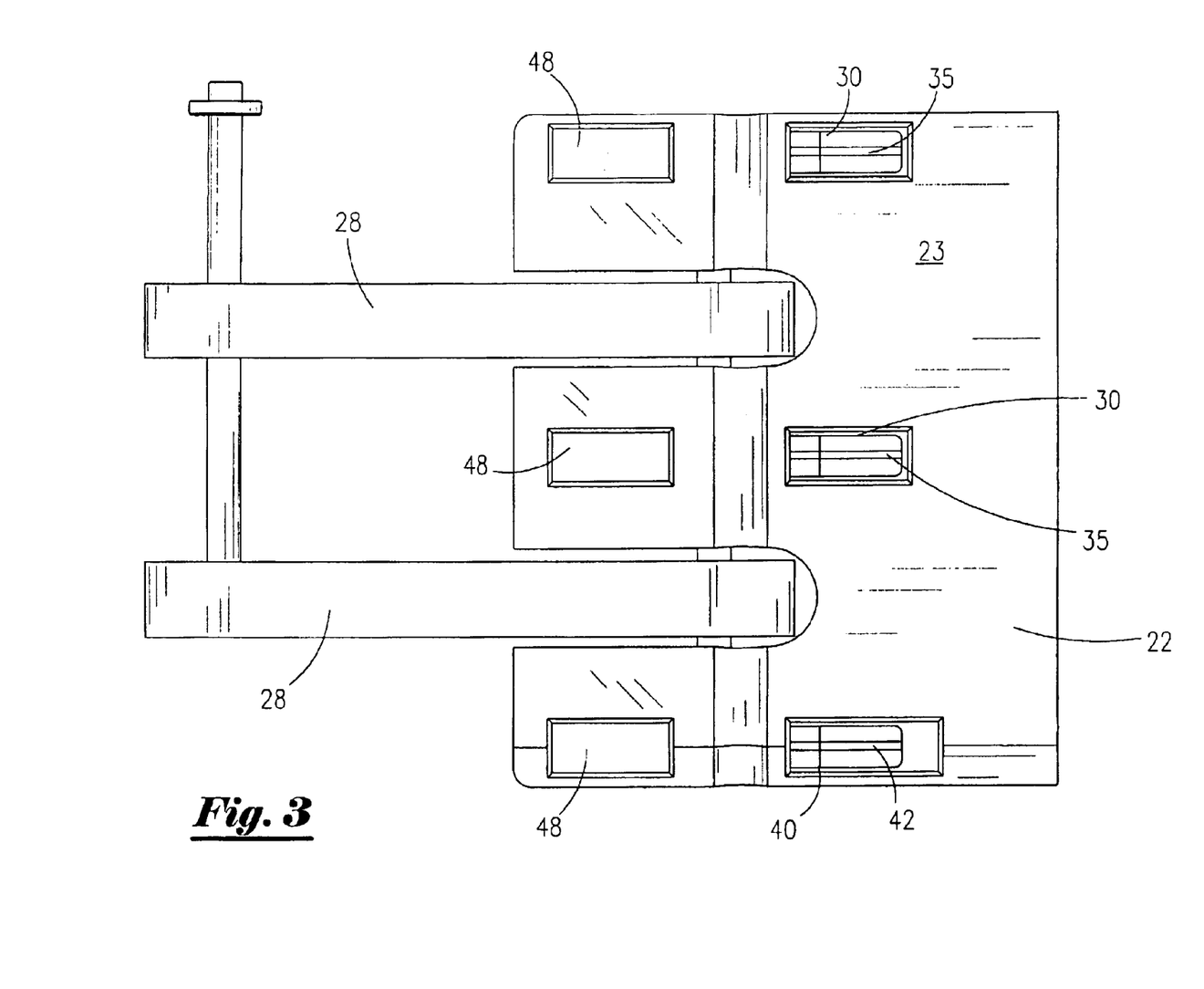
FIG. 3 is a sectional elevation view of the harvest chamber sidewall on line 3—3 of FIG. 2.
Figure 4:
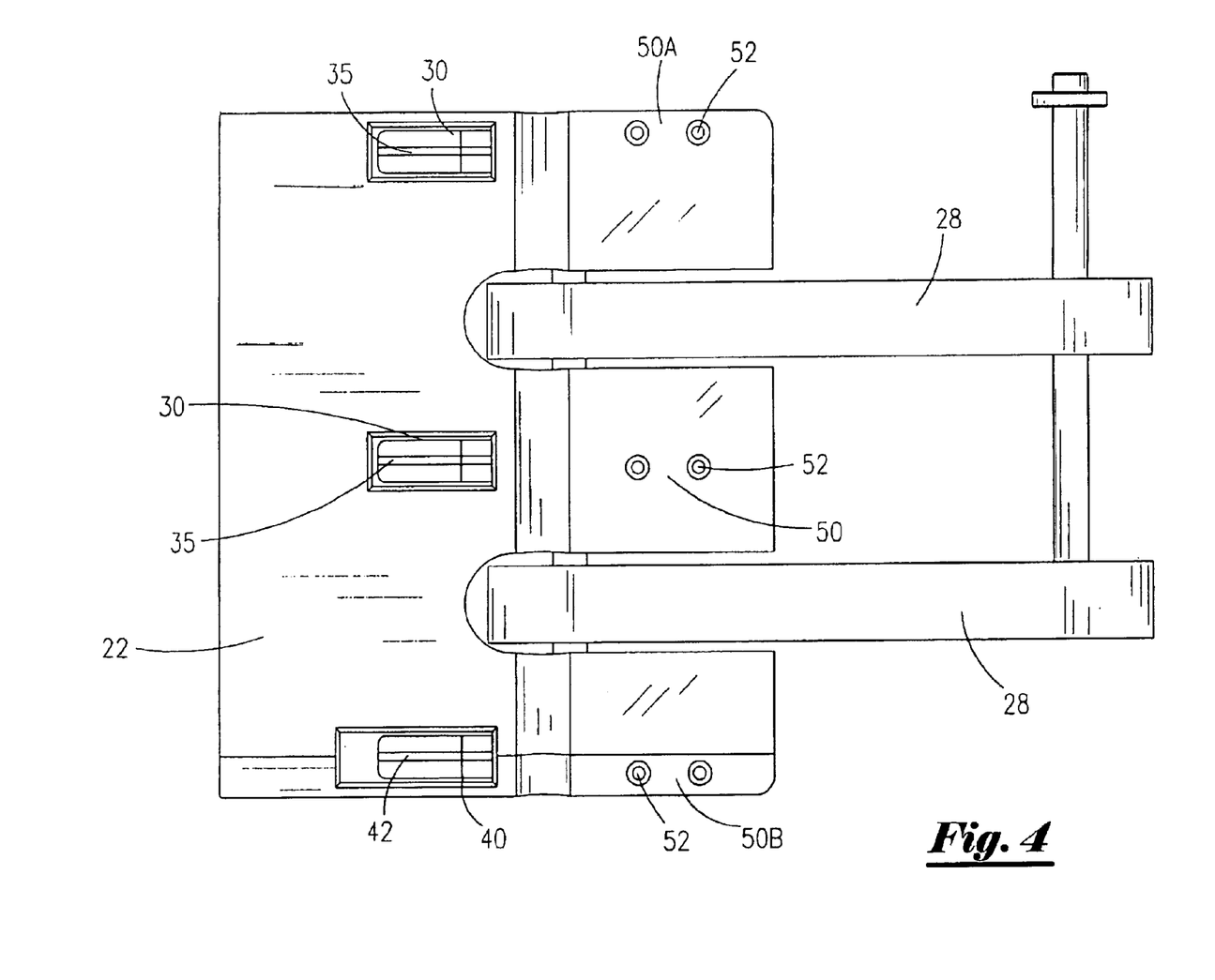
FIG. 4 is a sectional elevation view of the harvest chamber sidewall opposite that depicted in FIG. 3.

Within each harvest chamber (20) is a defoliation blower assembly (30) comprised of a plurality of adjustable blower nozzles (35), depicted in FIGS. 3 and 4, positioned at selected locations along each of the sidewalls (23, 24). The blower nozzles (35) are connected to blowers, not shown (37) mounted on the chassis (12) for directing high velocity streams of air through the nozzles (35), via blower ducts, onto the stalks (8). These high velocity air streams remove the stems and leaves from the stalks (8). The nozzles (35) and blowers (37) have control means (36) connected to the operator control station (16) for adjusting by remote control the velocity and direction of air flow from the nozzles, both in azimuth and angle, to create as desired both direct air flow and cyclone air flow in the harvest chamber to facilitate the defoliation of the sugarcane stalks (8).

Also positioned within each harvest chamber assembly (20) is a debris vacuum assembly (40) comprised of a plurality of vacuum or suction ports (42) connected to a suction motor (44), via suction ductwork, for removing by vacuum the leaves and stems from the harvest chamber (20) and for delivering the defoliated leaves and stems to the foliage collection assembly (80).

As shown in FIG. 3, the suction ports (42) are positioned at the base of the sidewalls (23, 24) and may be positioned at other desired locations along the chamber sidewalls (23, 24) to facilitate removal of the defoliated leaves, stems and other debris from the harvest chamber (20) as defoliation takes place. The debris vacuum assembly (40) has control means (46) connected to control station (16) for remote operation of the vacuum system from the control station (16).

Positioned within each harvest chamber (20), at selected locations, are a plurality of stalk cutting assemblies (50). Each cutting assembly (50) is comprised of hydraulic jets (52), on-board fluid reservoirs (53) and pumps (54) and conduit for delivering needle-like streams of water or other desired fluid at high pressure for cutting the stalks (8). Fluid collection assemblies (48), shown in FIG. 3, comprised of collection troughs, conduit and pumping means are provided to collect and deliver residual cutting fluids produced from the jets (52) back to the reservoirs (53) for reuse. Each stalk cutting assembly (50) has control means (56) connected to control station (16) for remote operation of the cutting assembly from the control station (16).

The fluid used to supply the jets (52), typically water, may be treated with fertilizers, insecticides, preservatives or other such chemicals as may be required to facilitate the growing, harvesting and processing of the stalks (8). It is thought that hydraulic jets such as the water jets manufactured by Jet Edge Corporation of Minneapolis, Minn. would be suitable for use in the cutting assembly (50).

At least two cutting assemblies (50) is provided for each chamber (20). An upper cutting assembly designated (50A) is intended to trim the top of the sugarcane stalks (8) to an even height. A lower cutting assembly designated (50B) is intended to cut the sugarcane stalks (8) at their base.

As shown in FIGS. 1 and 2, the stalks (8) are gathered in the entrance (22) of the harvest chamber (20) as the harvester moves along the row of sugarcane stalks for cutting and processing. Positioned in the harvest chamber (20) are a series of revolving, opposing, resilient conveyor belts (28) that grab, hold and feed the sugarcane (8) through the chamber (20) in a substantially upright position.

As the sugarcane stalks are gathered into the chamber (20), the stalks (8) are defoliated by means of the defoliation assemblies (30). Then, as the stalks (8) progress through the chamber (20), they are grabbed and supported by means of the revolving, opposing, resilient conveyor belts (28) and cut to desired lengths by the cutting assemblies (50). After being cut, the stalks (8) are delivered by the conveyor belts (28) to the collection bay assembly (60) and then to the stalk discharge assembly (70) by conveyors, vacuum systems or other conveying systems for subsequent transfer to collection vehicles (4) having collection wagons (6) in the field and then ultimately to a grinding mill or other desired location.

Figure 5:
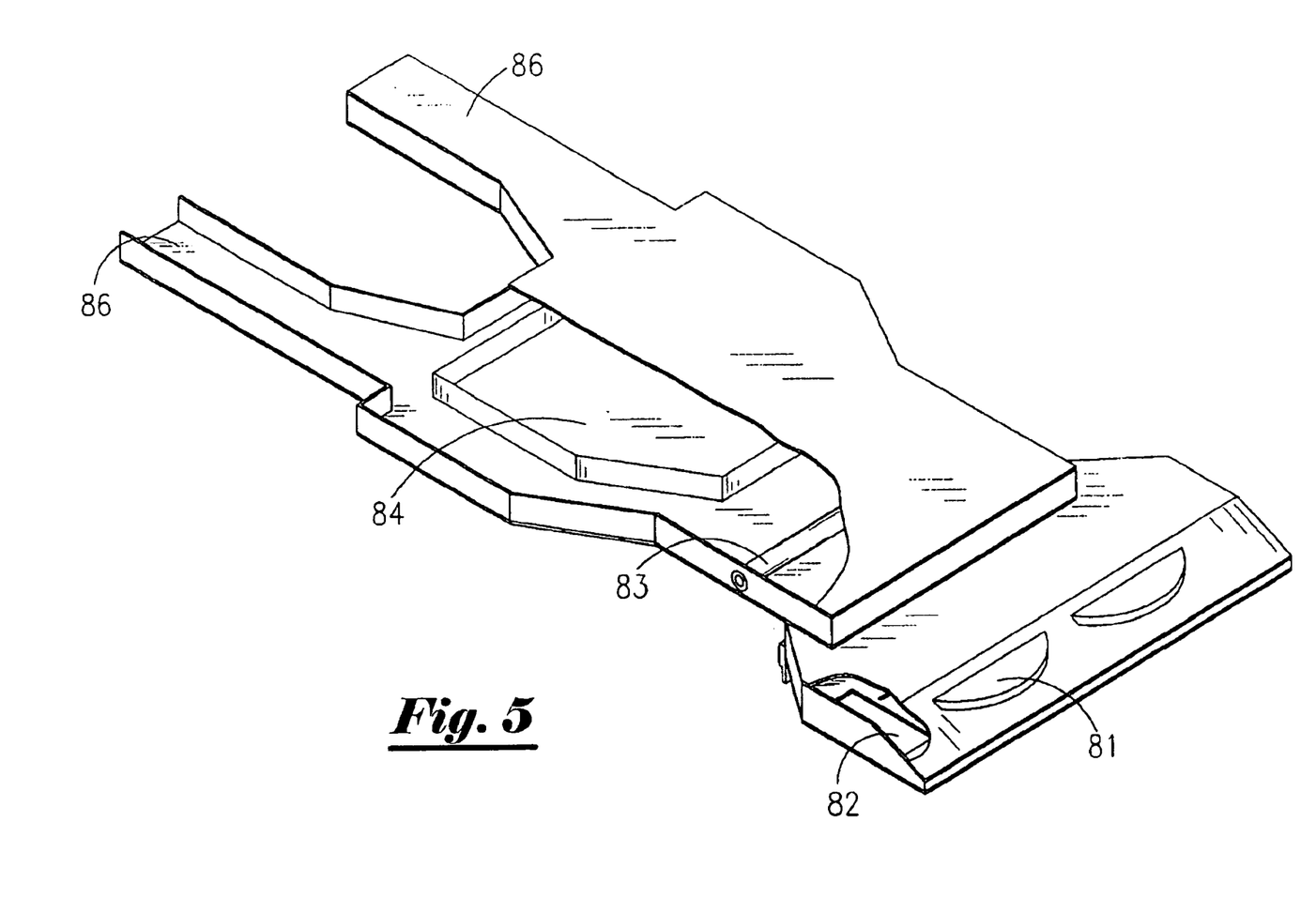
FIG. 5 is a perspective view of the foliage recycling assembly of the harvester depicted in FIG. 1.

Referring now to FIG. 5, the foliage collection assembly (80) is mounted on the chassis at a desired location for receiving the leaves, stems and other debris removed from the harvest chambers (20) by means of the debris vacuum assembly (30). Vacuum lift fans (81) or other transporting means deliver the foliage debris to the foliage intake manifold (82) to shredding means (83) where the foliage debris is shredded or otherwise reduced in size by shredding rollers or other shredding means. The shredded debris is then moved to the kill chamber (84) where the foliage debris is decomposed by closed incineration or other decomposing means. The decomposed debris is then delivered back to the soil of sugarcane field via debris exhaust chutes (86).

To facilitate delivery of the decomposed debris to the soil, the harvester (10) may be fitted with a pelletizing device to compact the decomposed debris into small pellets to minimize the dust and to facilitate incorporating the decomposed debris with the soil in the field by injecting, tilling or other injection means.

The chassis (12) may also have means for providing hydraulic or electrical power to activate a plurality of harvesting equipment, blowers, vacuums, conveyors, elevators and other accessories that may be incorporated into the harvester (10) for accomplishing the cutting and offloading of the stalks (8).

Figure 6:
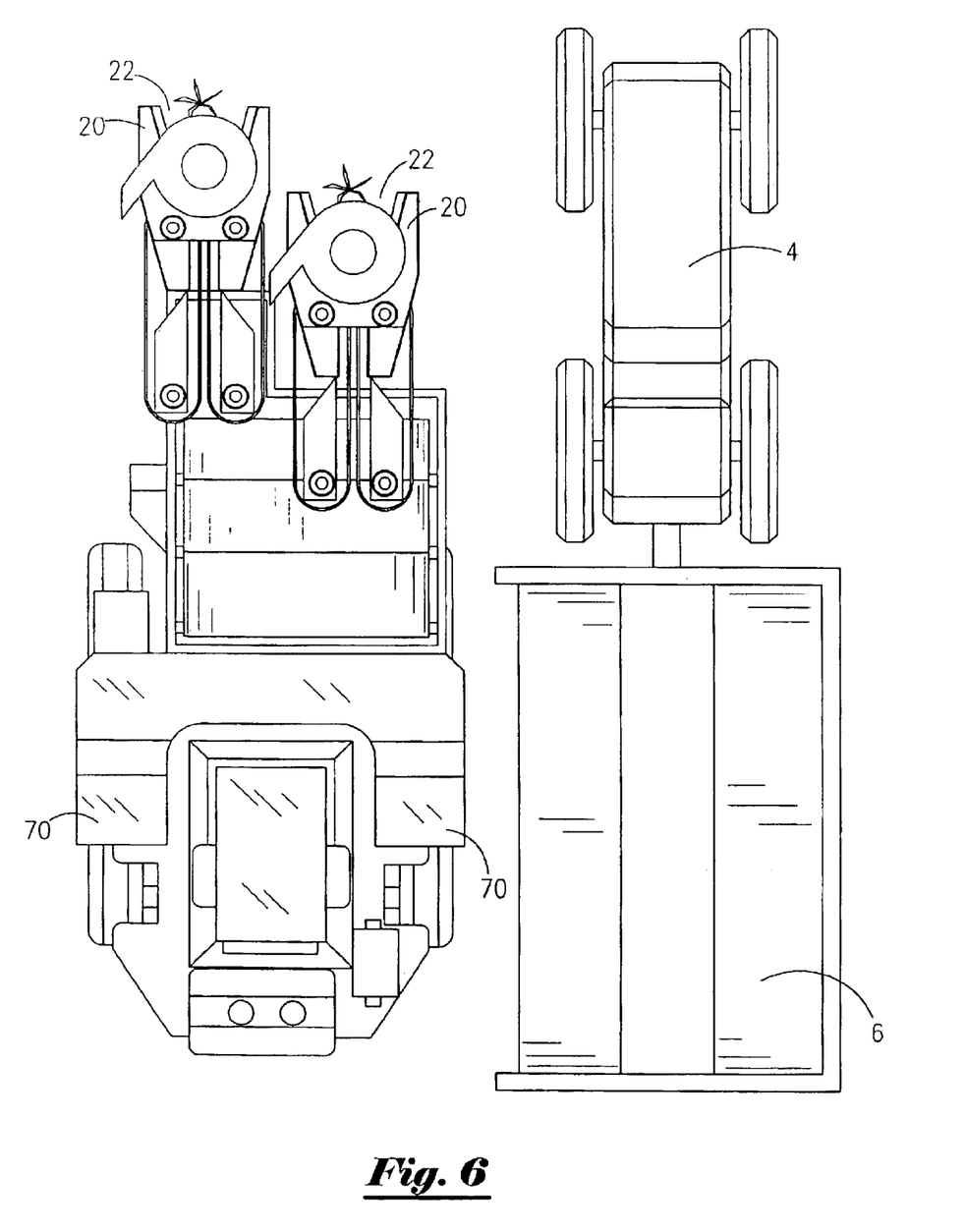
FIG. 6 is a plan view of the harvester depicted in FIG. 1 shown with dual harvest chambers shown in operation with an off-load vehicle.

As shown in FIG. 6, a top view of the harvester (10) and offload vehicle (4) having wagon (6), the harvester (10) will have a plurality of harvest chambers (20). The sugarcane stalks (8) are gathered into each harvest chamber (20) for cutting and processing as the harvester (10) moves along the rows of sugarcane stalks (8). Stalks (8) are delivered to the wagon (6) via the stalk discharge assembly (70) for ultimate transportation to a processing mill.

Figure 7:
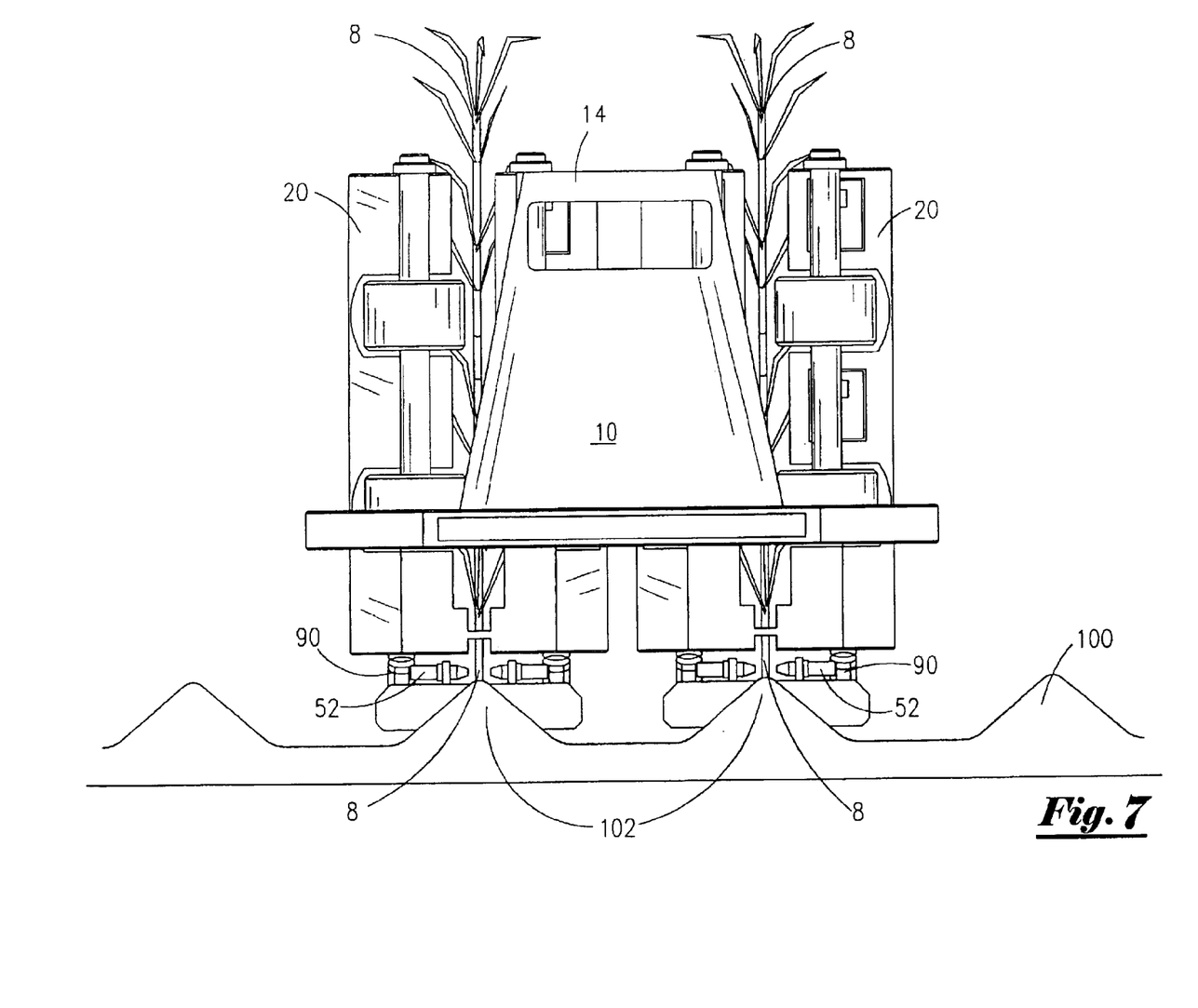
FIG. 7 is a schematic cross-sectional view of the harvester depicted in FIG. 1 showing the cutting height compensator.

As an optional attachment to the harvester (10), a cutting height compensator (90) shown in FIG. 7 may be incorporated with the stalk cutting assemblies (50). The compensator will compensate for fluctuations in the height of the hydraulic jets (52) with respect to the ground surface as the harvester (10) is propelled along the rows of sugarcane stalks (8).

Figure 8:
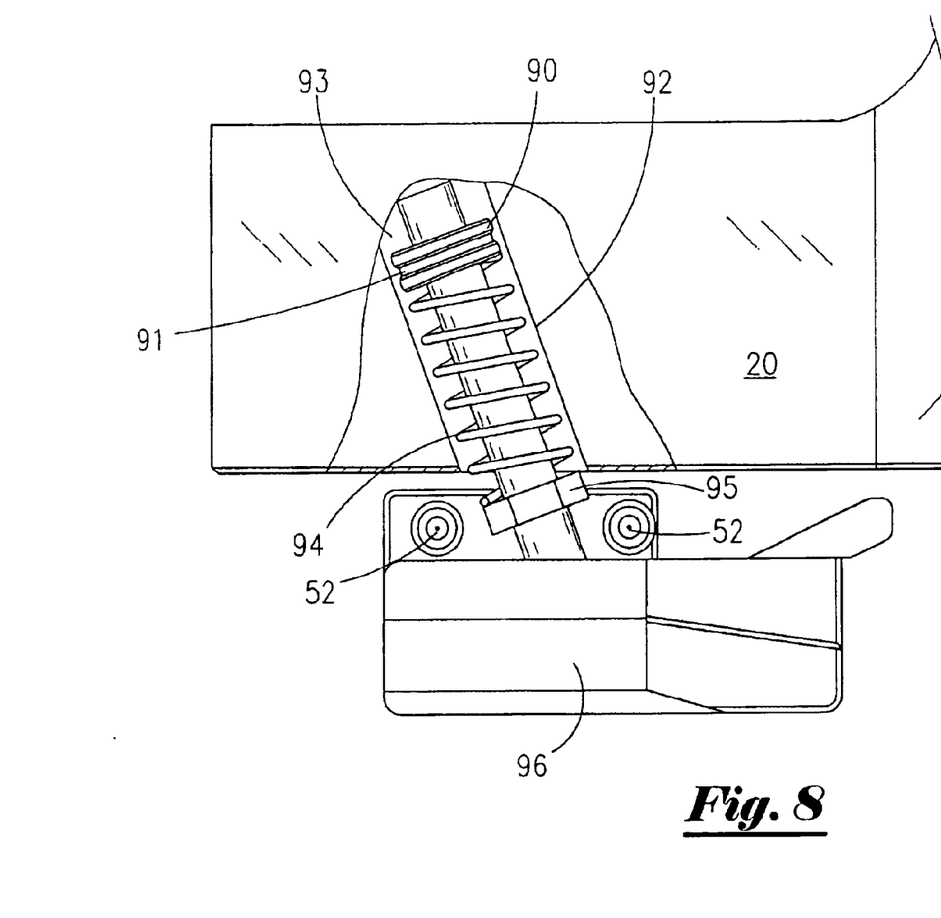
FIG. 8 is an enlarged cross-sectional side view of the cutting height compensator.

The compensator (90), shown in a cross-sectional side view in FIG. 8, automatically adjusts for vertical motion with respect to ground level by means of spring action generated on a piston (91) and piston rod (95) from a spring (94) and the counter-action of hydraulic force from a hydraulic fluid contained in cylinder (93) on the piston (91). The piston rod (95) is attached to a row skid plate (96) that runs along the side of a cane row (102). The plate (96) may be made from metallic alloys or it may be made from non-metallic composite materials as desired depending upon the electrical charges of the soil with which it comes in contact.

The resistance of the spring (94) may be adjusted by spring adjusting means to compensate for forces either above or below a set point established for soil compression. In use the spring (94) is pre-loaded to a desired tension. The hydraulic force generated on the piston (91) from the piston rod (95) varies as the skid plate (96) moves along the cane row (102) and also loads the spring (94). The hydraulic force generated on the piston (91) and rod (95) is counteracted by the spring forces generated on the piston (91) by the spring (94), which varies depending upon the resistance provided by different soil conditions encountered by the skid plate (96). The spring (94) will eliminate the direct forces from the undulating harvester (10) as it moves along a row and will supply vertical stability for the cutting nozzle (35).

It is thought that the apparatus and method for the sugarcane harvesting system described herein and many of its intended advantages will be understood from the foregoing description. It is also thought that it is apparent that various changes may be made in form, construction, and arrangement of the parts of the apparatus and method without departing from the spirit and scope of the invention or sacrificing all of its material advantages, the form herein described being merely illustrative of the preferred embodiment of the invention.

We claim:

1. A crop harvester comprising:
   a) a chassis,
   b) means for propelling said chassis through a field having crop stalks;
   c) a plurality of harvest chambers mounted on said chassis, each of said harvest chambers having an upper edge, a lower edge, and walls forming an opening into said harvest chamber for receiving said crop stalks;
   d) a plurality of nozzles means for selectively directing an air stream within each of said harvest chambers for removing unwanted foliage from said crop stalks;
   e) a plurality of vacuum ports within each of said harvest chambers for removing said unwanted foliage from said harvest chambers;
   f) a plurality of cutting mechanisms positioned within each of said harvest chambers at selected locations for cutting said crop stalks; and
   g) means for delivering cut crop stalks from said harvest chamber to a desired location.

2. The harvester as recited in claim 1, further comprising:
   a) a foliage collection area positioned on said chassis, and
   b) conduit means for delivering foliage from said vacuum ports to said foliage collection area.

3. The harvester as recited in claim 2, further comprising means for shredding said foliage delivered to said foliage collection area.

4. The harvester as recited in claim 2, further comprising means for decomposing said foliage delivered to said foliage collection area.

5. The harvester as recited in claims 3, further comprising means for delivering said shredded foliage back to said crop field.

6. The harvester as recited in claim 4, further comprising means delivering said decomposed foliage to said crop field.

7. The harvester as recited in claim 3, further comprising means for decomposing said foliage delivered to said foliage collection area.

8. The harvester as recited in claim 7, further comprising means for delivering said decomposed foliage to said crop field.

9. The harvester as recited in claim 6, wherein said means for decomposing said foliage delivered to said foliage collection area includes incineration means.

10. The harvester as recited in claim 8, wherein said means for decomposing said foliage delivered to said foliage collection area includes means for incinerating said foliage.

11. The harvester as recited in claim 9, wherein said plurality of cutting mechanisms positioned within each of said harvest chambers at selected locations includes a plurality of hydraulic jets for delivering streams of a desired fluid at high pressure for cutting said crop stalks.

12. The harvester as recited in claim 10, wherein said plurality of cutting mechanisms positioned within each of said harvest chambers at selected locations includes a means for providing a plurality of jets of a desired fluid for cutting said crop stalks.

13. The harvester as recited in claim 11, wherein said means for providing a plurality of jets of a desired fluid includes providing water reservoirs and pumps mounted on said chassis of said harvester.

14. The harvester as recited in claim 12, wherein said means for providing a plurality of jets of a desired fluid includes providing water reservoirs and pumps mounted on said chassis of said harvester.

15. The harvester as recited in claim 13 wherein said harvest chamber has a V-shaped opening for directing said crop stalks into said chamber.

16. The harvester as recited in claim 14 wherein said harvest chamber has a V-shaped opening for directing said crop stalks into said chamber.

17. The harvester as recited in claim 15 wherein said harvest chamber has a plurality of revolving resilient conveyor belts for moving said crop stalks through each of said harvest chambers.

18. The harvester as recited in claim 16 wherein said harvest chamber has a plurality of revolving resilient conveyor belts for moving said crop stalks through each of said harvest chambers.

19. The harvester as recited in claim 10 wherein said plurality of cutting mechanisms positioned within each of said harvest chambers at selected locations, includes providing an upper cutting assembly for trimming said stalks to an even height and a lower cutting assembly for cutting said stalks at their base.

20. The harvester as recited in claim 12 wherein said means for providing a plurality of jets of a desired fluid for cutting said crop stalks includes providing jets positioned at said upper edge of said harvest chambers for trimming said stalks to an even height and providing jets positioned at said lower edge of said harvest chamber for cutting said stalks at their base.

21. The harvester as recited in claim 10, further comprising means for compressing said decomposed foliage into pellets.

22. A harvester for harvesting stalks of sugarcane comprising:
   a) a chassis, said chassis having a forward end and a rearward end;
   b) means for propeling said chassis forward through a field having stalks of sugarcane;
   c) a plurality of harvest chambers mounted on said forward end of said chassis, each of said harvest chambers having an upper edge, a lower edge and a pair of side walls positioned to form a V-shaped forward opening into each of said chambers for receiving said sugarcane stalks;
   d) means for selectively directing an air stream within each of said harvest chambers for removing unwanted foliage from said sugarcane stalks;
   e) means for suctioning said unwanted foliage from said harvest chambers and delivering said unwanted foliage to a desired location within said harvester;
   f) a plurality of cutting mechanisms positioned at selected locations within each of said harvest chambers for cutting said sugarcane stalks to desired lengths; and
   g) means for delivering cut sugarcane stalks from said harvest chamber to a desired location within said harvester.

23. The harvester as recited in claim 22, wherein said means for selectively directing an air stream within each of said harvest chambers for removing unwanted foliage from said sugarcane stalks includes defoliation blower assembly comprised of:
   a) at least one blower mounted on said chassis, and
   b) a plurality of adjustable blower nozzles positioned at selected locations along each of said sidewalls of each of said harvest chambers, said blower nozzles connected to blowers by blower ducts, for directing high velocity streams of air onto said foliage of said sugarcane stalks and thereby removing said foliage from said sugarcane stalks.

24. The harvester as recited in claim 23, wherein said means for suctioning said unwanted foliage from said harvest chambers and delivering said unwanted foliage to a desired location within said harvester, includes:
   a) a plurality of suction ports positioned within each of said harvest chambers,
   b) a least one suction motor for providing a vacuum flow at each of said suction ports,
   c) a foliage collection chamber positioned on said chassis, and
   d) a conduit from said suction ports to aid foliage collection chamber for conveying said unwanted foliage to said foliage collection chamber.

25. The harvester as recited in claim 24 further comprising a plurality of revolving, opposing, resilient conveyor belts positioned within each of said harvest chambers for grabbing, holding and feeding said sugarcane stalks through each of said harvest chambers in a substantially upright position.

26. The harvester as recited in claim 25 further comprising a stalk collection bay assembly having a stalk collection bay, a conveyor system for delivering said cut sugarcane stalks from said harvest chambers to said stalk collection bay and a conveying system for subsequent transfer of said cut sugarcane stalks to collection vehicles to be positioned in said sugarcane field adjacent to said chassis of said harvester.

27. The harvester as recited in claim 26 wherein said foliage collection chamber includes means for shredding said unwanted foliage.

28. The harvester as recited in claim 27 further comprising:
   a) a foliage decomposing chamber;
   b) means for delivering said unwanted foliage from said foliage collection chamber to said foliage decomposing chamber; and
   c) means for decomposing said unwanted foliage within said foliage decomposing chamber.

29. The harvester as recited in claim 28 wherein said foliage decomposing chamber includes means for incinerating said unwanted foliage within said foliage decomposing chamber.

30. The harvester as recited in claim 27 wherein said foliage decomposing chamber includes means for distributing said decomposed unwanted foliage to said field.

31. The harvester as recited in claim 29 further comprising:
   a) a compactor for compacting said incinerated unwanted foliage into pellets; and
   b) means for transporting said incinerated unwanted foliage to said compacter; and
   c) means for distributing said pellets to said field.

32. A harvester for harvesting stalks of sugarcane comprising:
   a) a chassis, said chassis having a forward end and a rearward end;
   b) means for propelling said chassis forward through a field having stalks of sugarcane;
   c) a plurality of harvest chambers mounted on said forward end of said chassis, each of said harvest chambers having an upper edge, a lower edge and a pair of side walls positioned to form a V-shaped forward opening into each of said chambers for receiving said sugarcane stalks;
   d) means for selectively directing an air stream within each of said harvest chambers for removing unwanted foliage from said sugarcane stalks;
   e) means for suctioning said unwanted foliage from said harvest chambers and delivering said unwanted foliage to a desired location within said harvester;
   f) a plurality of jets, said jets dispensing a desired fluid under a desired pressure, positioned at selected locations within each of said harvest chambers for cutting said sugarcane stalks to desired lengths;
   g) means for delivering cut sugarcane stalks desired location within said harvester; and
   h) means for controlling said jets, said means for selectively directing an air from said harvest chamber to a stream, and said means for suctioning said unwanted foliage.

33. The harvester as recited in claim 32, wherein said means for selectively directing an air stream within each of said harvest chambers for removing unwanted foliage from said sugarcane stalks includes defoliation blower assembly comprised of:

a) at least one blower mounted on said chassis, and b) a plurality of adjustable blower nozzles positioned at selected locations along each of said sidewalls of each of said harvest chambers, said blower nozzles connected to blowers by blower ducts, for directing high velocity streams of air onto said foliage of said sugarcane stalks and thereby removing said foliage from said sugarcane stalks.

34. The harvester as recited in claim 33, wherein said means for suctioning said unwanted foliage from said harvest chambers and delivering said unwanted foliage to a desired location within said harvester, includes:

a) a plurality of suction ports positioned within each of said harvest chambers, b) a least one suction motor for providing a vacuum flow at each of said suction ports, c) a foliage collection chamber positioned on said chassis, and d) a conduit from said suction ports to aid foliage collection chamber for conveying said unwanted foliage to said foliage collection chamber.

35. The harvester as recited in claim 34 further comprising a plurality of revolving, opposing, resilient conveyor belts positioned within each of said harvest chambers for grabbing, holding and feeding said sugarcane stalks through each of said harvest chambers in a substantially upright position.

36. The harvester as recited in claim 35 further comprising a stalk collection bay assembly having a stalk collection bay, a conveyor system for delivering said cut sugarcane stalks from said harvest chambers to said stalk collection bay and a conveying system for subsequent transfer of said cut sugarcane stalks to collection vehicles to be positioned in said sugarcane field adjacent to said chassis of said harvester.

37. The harvester as recited in claim 36 wherein said foliage collection chamber includes means for shredding said unwanted foliage.

38. The harvester as recited in claim 37 further comprising:

a) a foliage decomposing chamber;

b) means for delivering said unwanted foliage from said foliage collection chamber to said foliage decomposing chamber; and c) means for decomposing said unwanted foliage within said foliage decomposing chamber.

39. The harvester as recited in claim 38 wherein said foliage decomposing chamber includes means for incinerating said unwanted foliage within said foliage decomposing chamber.

40. The harvester as recited in claim 37 wherein said foliage decomposing chamber includes means for distributing said decomposed unwanted foliage to said field.

41. The harvester as recited in claim 39 further comprising:

a) a compactor for compacting said incinerated unwanted foliage into pellets; and b) means for transporting said incinerated unwanted foliage to said compacter; and c) means for distributing said pellets to said field.

42. The harvester as recited in claim 32 wherein said desired fluid includes a fluid comprising additives selected from the group comprising insecticides, fertilizers, preservatives and herbicides.

43. The, harvester as recited in claim 32 wherein said desired fluid includes a fluid wherein a grit medium has been added.

44. The harvester as recited in claim 32 wherein said chassis includes means for compensating for fluctuations in the position of said jets with respect to the surface of said field as said harvester is propelled through said field.

45. The harvester as recited in claim 44 wherein said means for compensating for fluctuations in the position of said jets includes:

a) A skid for engaging the surface of said field as said harvester moves through said field, b) An hydraulic cylinder mounted to said chassis, said cylinder containing a piston, a hydraulic fluid for positioning said piston and a spring positioned to oppose said positioning of said piston by said hydraulic fluid, and c) a rod having one end mounted to said piston and one end mounted to said skid.

46. The harvester as recited in claim 36 further comprising a fluid system mounted on said chassis for delivering said desired fluid to said jets, said fluid system comprised of:

a) a storage tank containing a desired quantity of said desired fluid, b) at least one pump;

c) conduit for delivering said desired fluid under pressure to said jets;

d) a suction motor for providing suction means for recovering said desired fluid after it has been dispensed from said jets; and e) conduit for returning said recovered fluid to said storage tank.

47. The harvester as recited in claim 46 further comprising means for providing hydraulic power to activate each of said blowers, said suction motors, and said pumps.

48. The harvester as recited in claim 46 further comprising means for providing electric power to activate each of said blowers, said suction motors, and said pumps.

49. A harvester for harvesting stalks of sugarcane comprising:

a) a chassis, said chassis having a forward end and a rearward end;

b) means for propelling said chassis forward through a field having stalks of sugarcane;

c) a plurality of harvest chambers mounted on said forward end of said chassis, each of said harvest chambers having an upper edge, a lower edge and a pair of opposing side walls positioned to form a V-shaped forward opening into each of said chambers for receiving said sugarcane stalks and a rearward opening for discharging said sugarcane stalks;

d) a plurality of revolving, opposing, resilient conveyor belts positioned within each of said harvest chambers for grabbing, holding and feeding said sugarcane stalks through each of said harvest chambers in a substantially upright position;

e) a plurality of adjustable blowers for selectively directing a high velocity air stream within each of said harvest chambers through a plurality of adjustable blower nozzles onto said sugarcane stalks and thereby removing unwanted foliage from said sugarcane stalks;

f) a plurality of vacuum pumps for creating a suction at a plurality of suction ports and thereby suctioning said unwanted foliage from said harvest chambers and delivering said unwanted foliage to a foliage collection chamber located within said harvester;

g) a plurality of hydraulic jets positioned at selected locations within each of said harvest chambers;

h) a storage tank containing a desired quantity of a desired cutting fluid, i) at least one pump and a quantity of conduit sufficient for delivering said desired cutting fluid under pressure to said hydraulic jets and thereby delivering said desired cutting fluid under pressure from said hydraulic jets to said sugarcane stalks at a pressure and velocity sufficient so as to cut said sugarcane stalks at desired locations along the length of said sugarcane stalks as said sugarcane cane stalks move through said harvest chamber;

j) a suction motor, said suction motor providing suction means for recovering said desired cutting fluid from said harvest chamber after said cutting fluid has been dispensed from said jets; and k) means for delivering cut sugarcane stalks from said harvest chamber to a desired location within said harvester; and l) control panel means mounted on chassis for controlling the flow of said cutting fluid from said jets, for controlling said air stream from said blowers, and for controlling said suctioning of said unwanted foliage and said cutting fluid from said harvest chambers.

50. The harvester as recited in claim 49 wherein, said means for delivering cut sugarcane stalks from said harvest chamber to a desired location includes a conveyor system for delivering said cut sugarcane stalks from said harvest chambers to a collection area for subsequent transfer of said cut sugarcane stalks to collection vehicles to be positioned in said sugarcane field adjacent to said harvester.

51. The harvester as recited in claim 50 wherein said foliage collection chamber includes means for shredding said unwanted foliage.

52. The harvester as recited in claim 51 further comprising:

a) a foliage decomposing chamber;

b) means for delivering said unwanted foliage from said foliage collection chamber to said foliage decomposing chamber; and c) means for decomposing said unwanted foliage within said foliage decomposing chamber.

53. The harvester as recited in claim 52 wherein said foliage decomposing chamber includes means for incinerating said unwanted foliage within said foliage decomposing chamber.

54. The harvester as recited in claim 53 wherein said foliage decomposing chamber includes means for distributing said decomposed unwanted foliage to said field.

55. The harvester as recited in claim 53 further comprising:

a) a compactor for compacting said incinerated unwanted foliage into pellets; and b) means for transporting said incinerated unwanted foliage to said compacter; and c) means for distributing said pellets to said field.

56. The harvester as recited in claim 49 wherein said desired cutting fluid includes a fluid comprising additives selected from the group comprising insecticides, fertilizers, preservatives and herbicides.

57. The harvester as recited in claim 49 wherein said desired fluid includes a fluid wherein a grit medium has been added.

58. The harvester as recited in claim 49 wherein said chassis includes means for compensating for fluctuations in the position of said jets with respect to the surface of said field as said harvester is propelled through said field.

59. The harvester as recited in claim 58 wherein said means for compensating for fluctuations in the position of said jets includes:

a. A skid for engaging the surface of said field as said harvester moves through said field, b. An hydraulic cylinder mounted to said chassis, said cylinder containing a piston, a hydraulic fluid for positioning said piston and a spring positioned to oppose said positioning of said piston by said hydraulic fluid, and c. a rod having one end mounted to said piston and one end mounted to said skid.

* * * * *